Feb. 14, 1933.  G. RAYMOND  1,897,332
OIL AND GAS SEPARATOR
Filed Dec. 9, 1929   2 Sheets-Sheet 1
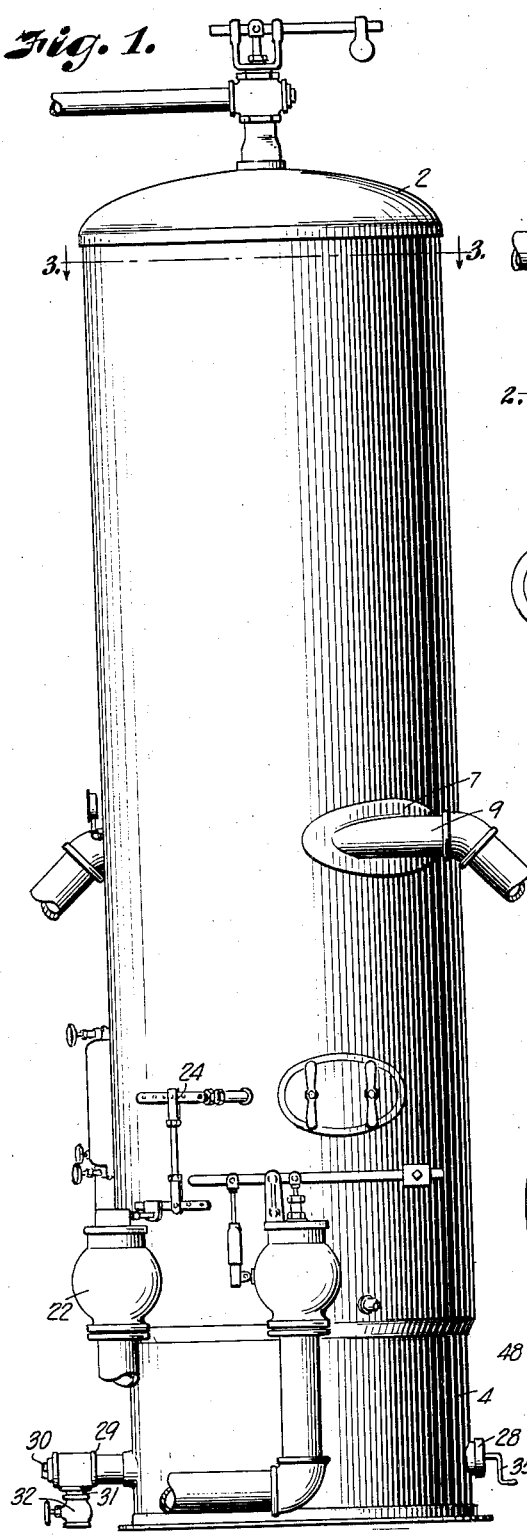
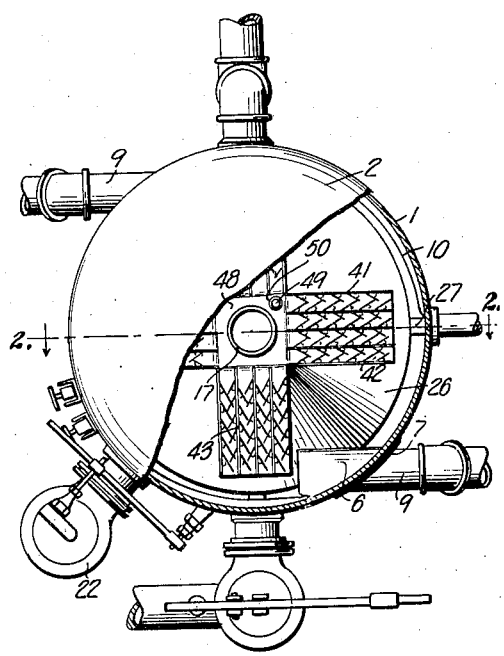
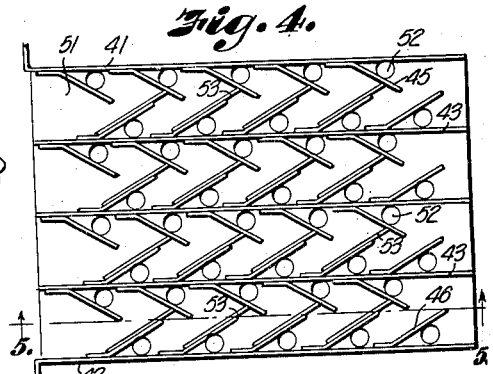
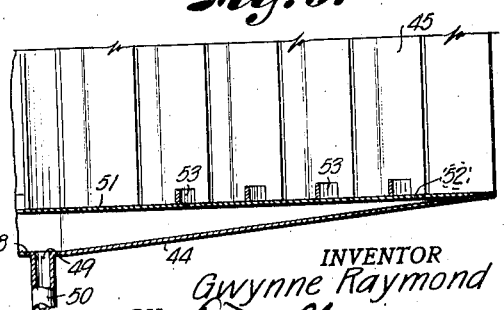
INVENTOR
Gwynne Raymond
BY
ATTORNEY Feb. 14, 1933.  G. RAYMOND  1,897,332
OIL AND GAS SEPARATOR
Filed Dec. 9, 1929  2 Sheets-Sheet 2
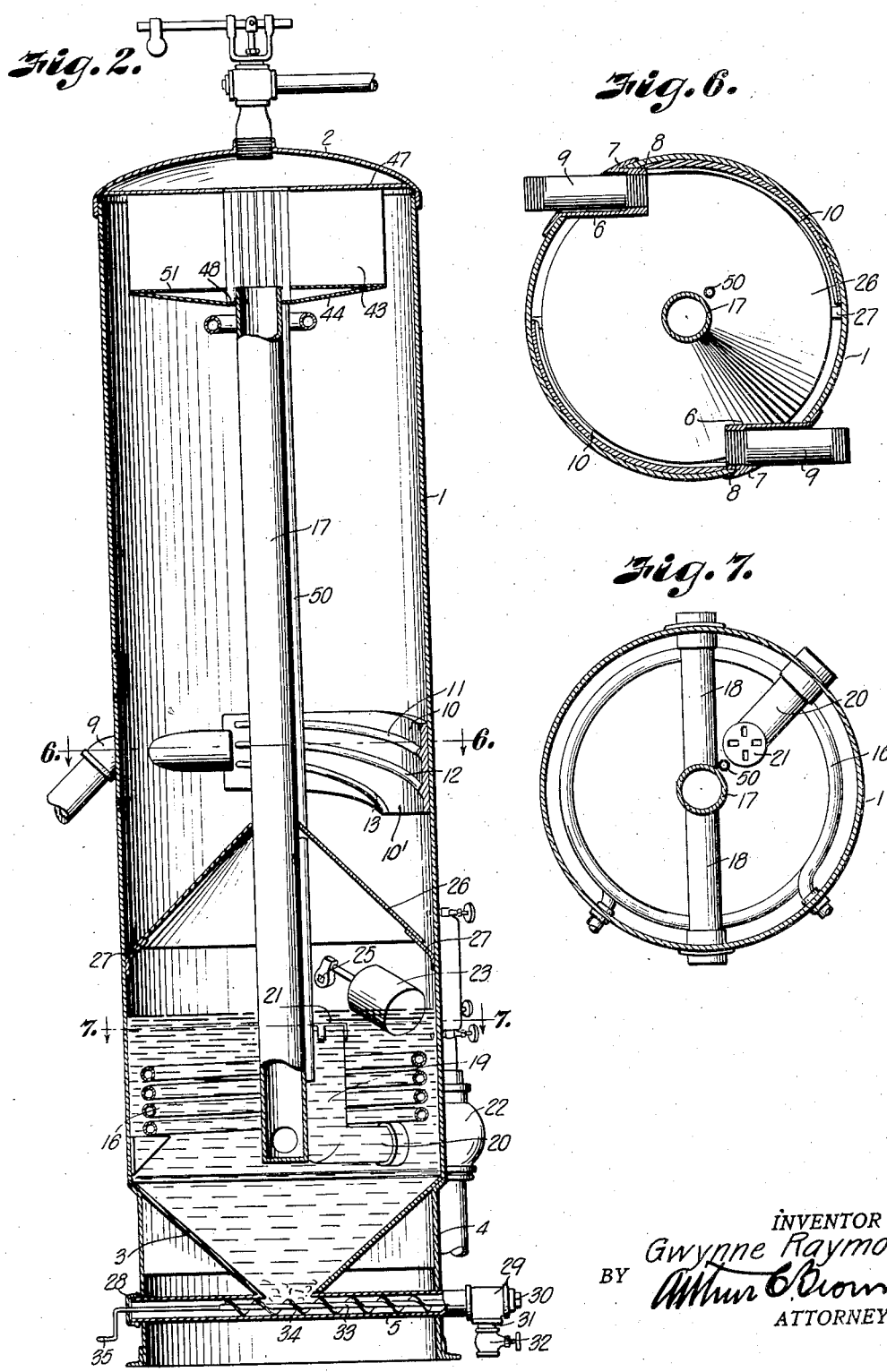
INVENTOR
Gwynne Raymond
BY Arthur C. Brown
ATTORNEY Patented Feb. 14, 1933

1,897,332

UNITED STATES PATENT OFFICE

GWYNNE RAYMOND, OF KANSAS CITY, MISSOURI

OIL AND GAS SEPARATOR

Application filed December 9, 1929. Serial No. 412,816.

My invention relates to apparatus for separating oil and gas, and more particularly to devices of that character comprising tanks having side inlets and outlet conduits having intake ends in the tanks, the principal objects of my invention being to prevent remixing of constituents of a mixture after separation, to minimize the contact of gas with oil separated therefrom, and to increase the opportunity for centrifugal separation of oil and gas.

In oil field practice an oil and gas mixture delivered to a separator may contain considerable amounts of abrasive material such as sand which tends to wear away the shell of the separator, and to choke the oil outlets thereof.

Further objects of my invention therefore are to protect the shell against the abrasive effect of sand and the like, to effect separation of sand and the like from a body of oil in the separator without restricting the flow of any constituents of the body, and to facilitate the independent removal of oil and sand.

Separator shells are ordinarily cylindrical, and preferably have tangential inlet couplings, said couplings usually including protuberant bosses to receive threaded pipes, the exterior couplings interfering with the convenient handling of the shells in the field.

A further object of my invention therefore is to form a tangential inlet internally of a shell to receive a threaded pipe, and obviate the presence of protuberances on the outer surface of the shell.

Float operated valves are often employed for controlling the oil outlets of separators, the floats being located outside of the separators.

A further object of my invention therefore is to guard a float located in a separator from the influence of sand and the like accompanying oil into the separator.

In accomplishing these and other objects of the invention, I have provided improved details of structure, the preferred forms of which are illustrated in the accompanying drawings, wherein:

Fig. 1 is an elevational view of an oil and gas separator embodying my invention.

Fig. 2 is a vertical central section of the separator.

Fig. 3 is a plan view of the separator, the cover being broken away to show separating elements adjacent the open upper end of the gas outlet pipe.

Fig. 4 is an enlarged plan view of one of the separating elements adjacent the gas outlet.

Fig. 5 is a section on the line 5—5, Fig. 4.

Fig. 6 is a section of the separator on the line 6—6, Fig. 2, illustrating the interior inlet couplings and the ribbed wearing plates.

Fig. 7 is a section on the line 7—7, Fig. 2, showing the inlet end of the oil outlet pipe, and illustrating the outlet pipe arms supporting the gas outlet pipe.

Referring in detail to the drawings:

1 designates an elongated vertical tank or shell having a cover 2, a concave conical bottom 3 forming a sump, and a supporting base 4 adapted to elevate the bottom above the surface of the ground to accommodate a muck or cleanout conduit 5 communicating with the sump and later particularly described, for removing bottom settlings or sludge from the tank.

The shell is provided with inlet openings intermediate its ends, and bosses or sleeves 6 extending in the shell tangentially to the inner surface thereof are fixed to the shell by suitable means such as welding. The outer ends of the sleeves are formed to lie substantially flush with the edges of the inlet openings. Reinforcing plates 7 may be welded to the outer surface of the shell and to the sleeve 6.

The sleeves are provided with internal threads 8 at their inner ends preferably formed on internal collars welded in the sleeves to receive the threaded ends of coupling nipples 9 adapted to be connected with supply lines.

Liquid delivered to the separator is discharged horizontally tangentially to the inner surface of the shell and in order to prevent erosion of the shell metal and destruction thereof by abrasive material accompanying the oil and gas mixture, a heavy chilled iron wearing plate 10 is fixed to the shell tangentially to the path of discharge of the mixture adjacent each inlet. The plates extend arcuately over a portion of the inner surface of the shell.

A plurality of ribs, for example three ribs 11, 12 and 13 are formed on each wearing plate extending horizontally and curving downwardly in the direction of movement of the tangentially discharged stream of mixture. The ribs form channels or grooves for guiding liquid circumferentially and downwardly. The inner ends of the ribs lie adjacent the mouth of the inlet, the upper rib starting at a point above the inlet and the lower rib curving sharply downwardly. The incoming mixture is thus deflected gradually downwardly and the heavier constituents first tending to separate from the stream of mixture are conducted downwardly away from the circumferentially moving stream of mixed gas and oil.

The end of each plate remote from the associated inlet is extended downwardly to form a wing 10' to accommodate the sharply curved outer end of the lowermost rib to provide a downwardly opening mouth for the groove formed by the middle and lower rib and to cover the area against which the fluid is discharged.

The lower end portion of the shell comprises an oil reservoir, and a heating coil 16 mounted in the reservoir and supplied with a suitable heating agent is adapted to heat the body of liquid to promote flow of the oil from the shell.

The gas outlet from the tank comprises a pipe 17 extending vertically in the shell on the axis thereof and having a branched lower end located in the bottom portion of the shell and an open upper end spaced from the top of the shell and communicating with a spray extractor housing later described.

Branch outlet pipes 18 connected with the lower end of the pipe 17 extend horizontally through suitable apertures in the shell and are fixed thereto for supporting the pipe 17 and stabilizing the same, the pipe branches 18 being connected suitably with gas delivery lines.

Gas rising in the shell enters the housing and upper end of the pipe 17 and passes downwardly therein to and through the outlet branches.

An oil outlet conduit includes an upturned vertical portion 19 having an intake in the reservoir, and the amount of oil in the reservoir is controlled to rise to a predetermined level slightly above the intake. A horizontal outlet branch 20 extends through the shell wall. A strainer or guard cap 21 is mounted on the intake end of the outlet pipe 19, having an annular series of radial slots for flow of oil therethrough, and comprising a lid for avoiding formation of a vortex above the outlet which would entrain gas with escaping oil.

The level of liquid in the tank is controlled by a valve 22 in the liquid outlet line operable by a float 23 through a lever arrangement 24 including a shaft 25 journaled in the shell, the float being adapted to rock the shaft.

In ordinary practice a tube communicating with a reservoir leads to a kidney outside the tank in which a float is located for controlling the outlet valve, the exterior float control being provided to avoid interference with the operation of the float by foreign matter entering the reservoir. I obviate such interference by rendering the portion of liquid adjacent the center of the reservoir effective for actuating the float, and protecting the float from disturbance by sand and the like entering with the mixture. This protection is afforded by a partition 26 comprising a conical baffle having downwardly diverging walls mounted on the gas outlet pipe and supported by spaced brackets 27 fixed to the shell. The partition is further useful for separating the oil reservoir region of the shell from the gas region.

The lower edge or periphery of the partition is spaced laterally from the shell to provide an annular passage adjacent the shell wall for liquid moving downwardly toward the reservoir, the liquid passing between the brackets.

The portion of liquid adjacent the center of the area protected by the partition may be made effective for operating the float by any suitable means, such as extending the intake of a kidney tube into said area, and as illustrated is accomplished by locating the float in said area of the reservoir.

The cleanout member or muck outlet 5 above referred to comprises preferably a horizontal tube communicating with the apical portion of the conical bottom and having opposite ends mounted in diametrically opposite openings in the base of the separator. The bottom 3 is preferably truncated and the cleanout tube provided with an inlet opening registering with the opening of the truncated bottom.

One end of the tube is closed by a removable cap 28. A T-fitting 29 is mounted on the opposite or outlet end of the tube with its body aligned with the tube and its branch depending. A removable plug 30 closes the end of the T body while a nipple 31 connected with the branch forms the normal outlet for muck flowing from the tank. Outflow of muck is controlled by a valve 32 below the nipple. Sand may accumulate at the apex of the cone bottom, and material in the tube may harden and fail to flow through the nipple. The removable character of the end closures permits a tool to be operated in the tube to dislodge sand in the apex of the bottom, and drill out hardened deposits.

The cap 28 may be removed for inserting a rod for ejecting the deposits for cleaning out straight through the T body. I preferably install an ejecting tool in the tube, comprising a shaft 33 extending on the axis of the tube and a worm or helical screw 34 on the shaft extending from the tank bottom outlet to the T.

The outer end of the shaft extends through a suitably stuffed opening in the cap 28, and is provided with a crank handle 35 for operating the screw. A tool is therefore constantly present in the tube for agitating and breaking up hardened muck and dislodging material to assist the flow thereof toward the valved outlet, and ejecting hardened material through the body of the T.

Attention is particularly called to the fact that the incline of the bottom 3 is relatively steep whereby sand tends to slide readily downwardly toward the cleanout tube and is thus quickly removed from the body of oil.

A major portion of gas in a gas and oil mixture will be separated during centrifugal and rotary motion of the stream of mixture adjacent the inlets and the gas will move upwardly toward the intake of the gas outlet.

Located adjacent the upper end of the gas outlet pipe is a spray extractor comprising a series of rectangular housings or conduits extending horizontally radially in the shell with outer ends spaced from the wall of the shell and inner ends spaced from the pipe 17 and supported as presently described. The housings contain a plurality of baffles for removing liquid from the fluid stream moving through the housings toward the gas outlet pipe.

Each housing comprises parallel walls including side walls 41—42 and partitions 43, and a bottom plate 44 inclined downwardly inwardly forming a sloping pan bottom for the housing. Vertical ribs or herringbones 45 and 46 extending forwardly at sharp angles to the side walls and the partitions and fixed thereto form tortuous passages between the walls.

Each housing is covered by a plate to which the upper edges of the vertical side walls and partitions are securely and sealingly fixed by suitable means such as welding, the inner edges of the cover plates registering with the inner ends of the walls to leave a central aperture for admitting extracted gas to the top of the tank. The top or cover 2 has a central aperture provided with a nipple affording additional egress for extracted gas when desired, and also affording access for the gas moving from the housings to the safety valve mechanism mounted with nipple in accordance with usual practice.

The housing covers referred to may comprise a single plate 47 having a central aperture. The plate covers the spaces between the annularly arranged housings and extends laterally therefrom to the tank wall, and is fixed to the wall to support the housings. The plate thus seals the upper end of the tank from the main chamber thereof, and gas must pass through the housings to the outlet pipe and the space beneath the cover 2.

The inner edges of the sloping pans are connected to a square plate mounted on the gas outlet pipe and forming the bottom of a box-like basin including the housings arranged around the upper ends of the gas outlet pipe.

Liquid delivered by the drainage pans 44 to the basin plate 48 moves by gravity therefrom through a drainage outlet 49 into a liquid conducting tube 50 extending below the level of liquid in the reservoir to effect a liquid seal.

The baffles extend at sharp angles forwardly from the vertical supporting walls and partitions, and have vertical free edges lying substantially on the axial lines of the tortuous passages. The angular relation of the baffles to the horizontal planes of their upper and lower edges is also important, the chief consideration being that the upper ends thereof do not project farther down stream in the path of the gas streams than their lower ends. The baffles may slope to any desired extent in the opposite direction, or may be vertical as illustrated, to avoid formation of pockets in the upper ends of the housings, and promote flow of liquid downwardly over the surfaces.

The bottom end edges of the baffles are spaced suitably from the drainage plate 43 to permit flow of oil over the sloping pan bottom toward the drainage outlet.

I may also install horizontal partition plates 51 on the bottom ends of the herringbone ribs and provide oil outlet openings 52 in the plates in the narrow angle pockets formed by the ribs and walls to permit liquid to drop from the bottom plate to the sloping pan.

In conjunction with the construction just described, and in order to prevent liquid from flowing inwardly over the horizontal partition toward the gas outlet pipe, narrow liquid baffles or dams comprising bars or plates 53 extending transversely across the tortuous passages are preferably attached to the lower edge portions of one series of baffles for preventing flow of oil through the space between adjacent baffles.

In using apparatus embodying the elements described, initial separation of gas from heavier particles is effected by centrifugal and rotary motion of the stream of inlet mixture, the curved deflector ribs promoting the rotary motion of the stream and preventing oil spray from spreading into the gas region of the shell.

The spacing of the outlet housings including the herringbone extractors above the inlets affords a relatively large open space for prolonging the period of whirling of the gas mixture. The oil will work outwardly to the shell and trickle downwardly on the steel surface to the bottom.

The ribbed wearing plate does not interfere with the movement of liquid over the shell toward the bottom, and affords helical tracks or shelves for conducting trickling liquid out of the path of the inlet stream.

The conical partition prevents the rapidly whirling body of gas and oil mixture from stirring up the body of oil in the reservoir, since the rapidly whirling gas would cause waves and spray to form on the surface of the oil and reentrain an appreciable amount of oil spray into the rotatively moving body of gas. The partition therefore isolates the body of oil in the reservoir and induces a region of quiet gas below the partition above the oil in the reservoir.

Heavy particles and particularly foreign matter such as sand discharged with the inlet stream of mixture, slides over the conical partition to the passage between the periphery thereof and the shell, and thus is kept from falling upon the float. The foreign matter further moves directly downwardly along the wall of the shell to the conical bottom and due to the steepness of the bottom 3, the sand will move quickly and readily into the apex thereof and accumulate in a position where it may be readily removed. Solid matter thus enters the oil reservoir only at its circumference and is prevented from lodging on the top of the interior float or other mechanism operable in the oil reservoir.

What I claim and desire to secure by Letters Patent is:

1. In a separator of the character described, including a vertical, cylindrical tank, a plate on the inner surface of and conforming to the contour of the tank, having inwardly and downwardly extended ribs for directing liquid discharged onto the plate downwardly and spirally over the inner surface of the tank, and means for delivering liquid onto the plate at the upper ends of the ribs.

2. In a separator of the character described, including a vertical, cylindrical tank, a plate on the inner surface of and conforming to the contour of the tank, having inwardly - extended, downwardly - diverging ribs for directing liquid discharged onto the plate downwardly and spirally over the inner surface of the tank, and means for delivering liquid onto the plate at the upper ends of the ribs.

In testimony whereof I affix my signature.

GWYNNE RAYMOND.